United States Patent Office 3,519,691
Patented July 7, 1970

3,519,691
O-HEMIACETALS OF FORMALDEHYDE AND CATALYTIC PROCESS OF MANUFACTURE
Hans von Portatius, Marl, Germany, assignor to Chemische Werke Huls Aktiengesellschaft, Marl, Kreis Recklinghausen, Germany, a corporation of Germany
No Drawing. Filed July 13, 1965, Ser. No. 471,759
Claims priority, application Germany, July 24, 1964, 1,241,432
Int. Cl. C07c 41/00
U.S. Cl. 260—611
11 Claims

ABSTRACT OF THE DISCLOSURE

Several novel O-hemiacetals useful as convenient sources of formaldehyde, etc., and a novel improved method of making O-hemiacetals of formaldehyde comprising (a) adding gaseous formaldehyde to: (b) a liquid comprising an organic compound containing one hydroxyl group; and (c) reacting (a) and (b) with vigorous and sufficient agitation to insure uniform distribution of said formaldehyde and cooling at a temperature between $-100$ and $150°$ C., the rate of adding said formaldehyde being sufficiently slow so that the concentration of free formaldehyde in the solution does not exceed 8%, the improvement comprising conducting the reaction in the presence of a catalytic quantity of a catalyst selected from the group consisting of acids, phosphines, arsines, stibines, nitrogenous compounds and mixtures thereof.

---

The process of the present invention relates to a catalyzed process of making O-hemiacetals of formaldehyde and the products obtained thereby.

As disclosed in Kirk-Othmer, Encyclopedia of Chemical Technology, 2nd edition (1963), vol. 1, pp. 107–109, hemiacetals are formed as intermediate products in the usual preparation of acetals from aldehydes and alcohols. The formation of hemiacetal is indicated by changes in the refractive index and specific gravity of the alcohol-aldehyde mixture and by the disappearance of the carbonyl grouping as shown by adsorption spectra. According to the prior art, hemiacetals are difficult to isolate and decompose on heating.

An object of the present invention is to obtain O-hemiacetals of formaldehyde by the reaction of anhydrous liquid or gaseous formaldehyde with compounds and polymers having at least one hydroxyl group where the reaction mixture contains a catalyst.

It is a particular object of the present invention to increase and control the speed of reaction of formaldehyde with monovalent and polyhydric alcohols such as those disclosed in Kirk-Othmer, "Encyclopedia of Chemical Technology," 2nd edition (1963), vol. 1, pp. 531–638, by the addition of a catalyst to the reaction mixture.

Other objects of the present invention are to form O-hemiacetals of formaldehyde and high molecular weight and high melting point compounds by dissolving the high molecular weight and high melting point compound in a solvent and by adding a catalyst to the reaction mixture.

If kept in open vessels, the O-hemiformals gradually give off formaldehyde. This property makes them especially useful as disinfectants and insecticides. The O-hemiformals, because of their chemical reactivity, also form useful intermediaries for organic syntheses. Bis- and polyformals are suitable components for the production of synthetic resins, lacquers and adhesives.

According to the prior art disclosures of hemiacetal processes, pure hemiacetals have not been obtained free from alcohol or aldehyde residues, polymeric aldehydes, addition products of hemiacetals and aldehydes, complete acetals, etc.

With reference to formaldehyde, which as the first member of a homologous series has moreover divergent properties, it has lately been assumed (J. F. Walker, Formaldehyde, Reinhold Publishing Corp., New York (1964), p. 264, lines 9–10), that the equilibrium between formaldehyde and alcohol is much further on the side of the hemiformal than with other aldehydes.

For the production of hemiformals it has been variously suggested by the prior art that this may be accomplished by reacting aqueous formaldehyde solutions with alcohols, followed by removal of the water from the hemiformals. Such a process, however, is very tedious and can be performed in only certain cases. It also generally produces hemiformal mixtures containing besides the hemiformal, also alcohol, some residual water, formaldehyde and polyhemiformals.

According to the prior art, it is known that instead of formaldehyde solutions, it is possible to react paraformaldehyde in the presence of catalysts with mono- or polyvalent alcohols. In the presence of acids such as p-toluene-sulfonic acid or Lewis acids such as boron fluoride, there is then generally obtained from simple alcohols only the corresponding complete acetal with separation of the water, from simple diols such as glycol, 1,3-propane-diol, and 1,4-butane-diol only the corresponding cyclic acetals, while with higher homologous diols such as 1,5-pentane-diol, 1,7-heptane-diol, and 1,10-decane-diol the corresponding straight-chain polyformals with the liberation of water. On the other hand, in the presence of alkalis such as sodium or potassium hydroxide, hemiformal mixtures are obtained without the liberation of water or the formation of complete acetals, cyclic acetals or polyformals. The catalysis with alkalis is necessary here for the depolymerization of the paraformaldehyde and cannot be substituted by strong tertiary organic bases such as triethylamine or tri-n-butylamine. The reaction with paraformaldehyde in the presence of alkali occurs however with appreciable velocity only at higher temperatures (50–80° C.) where the reaction is vigorously exothermal and is difficult to control on a large scale. Uncontrollable amounts of formaldehyde are then set free and result in part to a polyaddition of the formaldehyde to an already present hemiformal and therefore produce mixtures. By the depolymerization of the formaldehyde there is a liberation of about 5% water, depending on the composition of the material, which is often determined only by the hemiformal and is difficult to remove from the latter.

The bis-hemiacetals of diolefins and formaldehyde are especially useful because they are capable of undergoing further reactions with other compounds to produce high molecular weight synthetic substances which are hardenable. It is exactly for these reactions that the polyvalent formaldehyde-hemiacetals in especially pure condition, free from all undesired side products, intermediate products or equilibrium components are useful because it is only with pure starting substances whose reactions are known that well-defined polycondensates with predictable properties are produced, see for example, concurrently filed application, Ser. No. 471,702 and 471,761 of July 13, 1965 which as filed refer to this application and describe industrially useful polycondensates made on the basis of the O-hemiacetals of this invention.

Hemiacetals of formaldehyde also may be produced in a very simple manner by a process not known in the prior art by introducing pure formaldehyde slowly and with cooling according to the speed of the reaction, into a substituted or unsubstituted mono- or polyvalent alcohol which may be of high molecular weight and dissolved in an inert solvent, in such a manner that the reaction temperature will be at least 20° C. above and preferably 50 to 110° C., above the boiling point of the pure formaldehyde, and with the concentration of free formaldehyde during the reaction not exceeding 8%, preferably not 5%.

Experience has shown that the formation of O-hemiformals often occurs at only moderate speed, and sometimes so slowly that it could not be referred to as a reaction at all.

In the reference of Houben-Weyl, vol. VII, Part 1 (1954), p. 416, it is stated that the formation of hemiformals is not influenced by the presence of catalysts.

On the other hand, according to other prior art references, the conversion of practically water-free formaldehyde with anionic catalysts such as amines or phosphines, or with cationic catalysts, e.g. Lewis acids such as boron fluoride, are preferred methods of producing high molecular weight polyoxymethylenes.

According to the present invention, applicant has discovered the new and unexpected result that hemiacetals of formaldehyde are produced at a greatly increased rate by reacting formaldehyde with an unsubstituted or even a substituted mono- or polyvalent and possibly high molecular weight alcohols in the presence of an acid or a phosphine, arsine, stibine or nitrogenous compound. Suitable nitrogenous compounds are a N-methylol compound, a N-methylol ether, an amide or its derivative, an imino ether, a hydrazine derivative, a dithiocarbamic acid derivative or a quaternary ammonium compound, while suitable acid compounds are conc. sulfuric acid, perchloric acid, hydrochloric acid, p-toluene-sulfonic acid, or Lewis acids such as $BF_3$, $BF_3$-etherate, or oxonium fluoborate.

Under the reaction conditions of this process such catalayts will greatly accelerate the formation of hemiformals and in some cases will make their production possible.

Suitable catalysts which can be used in amounts of 0.00001% to 2% relative to the weight of the added alcohol are especially the tertiary, secondary and primary amines such as triethylamine, tri-n-butylamine, pyridine, piperidine, diethyl-amine, cyclohexyl-methyl-amine, butylamine, N-methyl-aniline, cyclohexylamine, isoamylamine and tri-n-octylamine, phosphines such as triphenylphosphine and tri-n-butylphosphine, stibines such as tri-n-butyl-stibine, arsines such as tri-n-butylarsine, and quaternary ammonium compounds such as tetramethyl ammonium bromide.

The catalyst is preferably introduced into the alcohol, whereupon the formaldehyde is added. The reaction, which occurs with the liberation of heat and which therefore requires effective cooling, succeeds especially well if the formaldehyde is introduced in gaseous form. In reactions which are performed at temperatures below the boiling point of monomeric formaldehyde (—21° C.) in liquid form, only at the rate at which it is used up. With the greatly increased reaction velocity resulting from the use of the catalyst, it is now possible in technical processes to introduce the formaldehye at a rate which would ordinarily be difficult or impossible without danger of producing undesired side-products such as paraformaldehye.

For the same reason, it is advantageous to quickly disperse the introduced formaldehyde by rapid stirring.

The reaction is advantageously performed at temperatures between —100 and +150° C., preferably between —20 and +130° C., and best at 30° C.

Especally pure O-hemiacetals are obtained if a pure water-free formaldehyde is introduced which is sufficiently free from ionized impurities not to polymerize.

The formaldehyde can, if desired, be diluted with an inert gas such as nitrogen, argon, neon, xenon and krypton.

Under normal conditions solid alcohols or pehonls are preferably used in the molten condition, provided the melting point is not higher than about 150° C. and a further reaction of the hemiformal will not occur, which would naturally depend on the nature of the alcohol or phenol. Compounds which melt at higher temperatures are preferably dissolved in a solvent which can form concentrated solutions of the alcohol, the formaldehyde being then allowed to react with the alcohol at lower temperatures. Suitable solvents for the high melting point compounds are ethers such as diethyl ether, diisopropyl ether, di-n-butyl ether, methyl-ethyl ether, hydrocarbons such as n-propane, n-butane, n-pentane, n-hexane, and n-decane, as well as mixtures such as petroleum ether, ligroin, aromatics such as benzene, xylene, anisol or mixtures thereof, and chlorinated hydrocarbons such as carbon tetrachloride, chloroform, tetrachlorethane, trichlorethylene and methylene chloride.

Suitable alcohols for reaction with formaldehyde are, e.g. methanol, ethanol, n-propanol, n-butanol, isobutyl alcohol, n-amyl alcohol, isoamyl alcohol, n-hexyl alcohol, n-heptanol, n-oxtyl alcohol, n-dexyl alcohol, lauryl alcohol, myristyl alcohol, cetyl alcohol, stearyl alcohol, benzyl alcohol, cyclohexanol, diethylene-glycol-monoethyl-ether, triethylene - glycol - monoethyl - ether, triethyleneglycol-monobutyl-ether, 1,2 - propylene-glycol-1-n-butyl-ether, ethylene-glycol - monomethyl - ether, isopropanol, sec. butyl alcohol, tert. butyl alcohol, sec. amyl alcohol, tert. amyl alcohol, 6-ethy-decanol-(3), 5-ethyl-heptanol-(2), 5-ethyl-nonanol-(2), and 6-ethyl-octanol-(3).

It is also possible for compounds which in addition to the hydroxyl function also contain one or more reactive double bonds, triple bonds, one or more epoxy-, nitrile-, nitro- or methoxy groups, or one or more halogen functions, to be reacted with formaldehyde in the presence of the named catalysts to form the corresponding hemiformals without in any manner changing the remainder of the molecule. Suitable compounds are, e.g. allyl alcohol, endomethylene-tetrahydro-benzyl-alcohol, ethylene chlorhydrin, 2-ethyl-3-hydroxy-hexanal, ethylene-glycol-monoacrylate, propylene-glycol-monoacrylate, and propylene-glycol-monomethacrylate.

Suitable polyhydroxy alcohols for reaction with formaldehyde are, e.g. glycol, propylene-glycol-1,2, propylene-glycol-1,3, butane-diol-1,4, pentane-diol-1,5, 1,4-butene-diol, 2,2-dimethyl-propane-diol-(1,3), hexane-diol-(1,6), decane-diol-(1,10), diethylene-glycol, triethylene-glycol, thiodiglycol, triethanolamine, thioglycol - sulfoxide, 3-amino-2,5 - dimethyl-hexane-diol-(2,5), 3,5-bis - (oxyisopropyl)-pyridine, hexane - dien-(2,4)-diol-(1,6), and other diols in which the carbon chain contains a double bond or a triple bond, also glycerol, hexane-triol, dioxyacetone, pentaerythrite, polyoles such as polyvinyl alcohol, cis-trans- and 1:1 cis/trans mixtures of 2,2,4,4-tetramethyl - 1,3 - cyclohexane - dimethanol - 1,4,2,5- or 2,6-norbornene - diol, also ether-group containing diols such as:

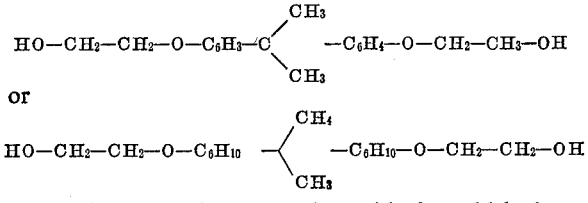

Especially useful for reaction with formaldehyde to form hemiacetals are phenols such as phenol, o-cresol, m-cresol, p-cresol, o-, m- and p-chlorphenol, p-bromphenol, o-, m- and p-nitrophenol, 2,4-dinitrophenol, guaiacol, cyclohexanol, eugenol, saligenine, o-oxy-acetophenone, o-cyclo-hexyl-phenol, pyrocatechol, resorcinol, hydroquinone, pyrogallol, oxyhydroquinone, o-, m- and p-aminophenol.

It is also possible to obtain lower hemiformals of polyvalent alcohols by introducing only as much formaldehyde as is needed for reaction with only one of the hydroxyl groups of diols, or with two of the hydroxyl groups of triols. The same alcohols can be used here as have already been described for use in the production of polyvalent hemiformals.

This new process is not limited, however, to hydroxyl containing compounds of low molecular weight. By this new process there is also a strong acceleration of the reaction of formaldehyde with hydroxyl groups on the ends, and especially with those on the sides of carbon chains to produce hemiformals without any cross-linking. The hydroxyl groups can be primary, secondary, tertiary or phenolic. It is advantageous if the high molecular weight compounds are in the liquid state, although solid compounds can be dissolved in inert solvents. Suitable solvents for high molecular weight compounds are benzene, toluene, chloroform, carbon tetrachloride, cyclohexane, dimethylsulfoxide, or cyclic acetals such as 1,3-dioxolane or its higher homologues, possibly with organic substituents. Cyclic acetals, however, are suitable as solvents only for basic or anionic catalysts. Acids, especially Lewis acids, have a tendency to split open some of the cyclic acetals. Suitable high molecular weight compounds for formaldehyde reaction are polyesters, preferably condensates of dibasic acids with trimethylol condensates of dibasic acids with trimethylol-propane, glycerol, polyethers, polythioethers, polycarbonates, saponified copolymers of vinyl acetate with vinyl chloride, styrene, butadiene, vinylidene chloride, acrylic esters, methacrylic esters, acrylic nitrile and maleic anhydride.

Hydrogenated ketone-formaldehyde resins are also suitable, and also copolymers whose alcoholic components can be, e.g. glycidol, endomethylene-tetrahydrobenzyl-alcohol or allyl alcohol. The hydroxyl content can vary widely from 0.001% to 80%, preferably between 0.05% and 50%, without the occurrence of cross-linking or the formation of complete acetal structures.

Among the alcohols that have been named there are some that will react with formaldehyde under the specified conditions without the use of any catalyst, e.g. n-propanol, cyclohexanol, lauryl alcohol, butane-diol and benzyl alcohol. In these cases, however, the catalysts greatly accelerate the reaction. Other alcohols such as tert. butanol, resorcinol, hydroquinone, pyrogallol and tert. amyl alcohol react hardly at all unless a catalyst is present.

Other alcohols, e.g. cyclohexane-dimethanol and glycerol will not react at all with formaldehyde below 65° C. unless a catalyst is present.

In most cases the catalysts, especially if they are present in only small amounts, can remain mixed with the hemiacetal that has been produced because they will not interfere with the further use thereof. The catalysts can, however, be removed by extraction with solvents, or by conversion into salts by the addition of acids to basic catalysts, or of bases to acid catalyst.

The inert solvents used can be removed by evaporation using a water jet aspirator.

The O-hemiformals of the present invention are stable, limpid to viscous liquids which are always miscible with alcohols such as methanol, propanol, etc., with aromatics such as benzene and toluene, with ethers such as diethyl ether, and with halogenated hydrocarbons such as chloroform, carbon tetrachloride, trichlorethylene and methylene chloride. If the diol component is miscible with water, then the corresponding O-hemiformal will be soluble in water.

Without further elaboration it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLES 1 TO 7

600 g. industrial paraformaldehyde are mixed with 270 g. phosphorus pentoxide and 750 ml. paraffin oil and the mixture then heated 3 hours to 85–130° C. with stirring. The resulting pyrolysis gases are conducted through an upright Dimroth cooler into a cooling system consisting of three cooling stages operating at temperatures of −30° C., −30° C., and −60° C. respectively. In the first and second stages, the monomeric formaldehyde is greatly purified by preliminary polymerization while in the third cooling stage the monomeric formaldehyde is obtained as a water-clear liquid 99.9% pure.

Into a 3-necked flask equipped with stirrer, inlet tube, thermometer, gas outlet tube, and water cooling jacket, the required amount of alcohol as indicated in Table I is introduced and an equivalent amount of the purified formaldehyde is conducted into the alcohol. The gas outlet tube is connected through a wash bottle to a mercury manometer so that every change of volume can be readily observed. The formaldehyde is then immediately converted into the hemiformal with the liberation of large quantities of heat while the stirrer is driven at 500 r.p.m. and the mixture is cooled to keep the temperature at the value indicated in column 4. The converion is quantitative. For comparison experiments are performed both with and without catalysts, and in each case the reaction is greatly accelerated by the presence of the catalysts.

In each case the products are clear and limpid to slightly viscous liquids which upon elementary combustion analysis give values which agree with those calculated. The cryoscopic molecular weights as determined in benzene/dioxane show that there is no dissociation into formaldehyde and the respective alcohols, nor is there any cyclic acetal formation with diols. The infra-red spectra give no indication of acetal structures. The densities and indices of refraction are given in columns 11 and 12.

TABLE I

| Ex. | Alcohol, parts by weight | Formaldehyde, parts by weight | Reaction Temp., °C. | Catalyst, parts | Formaldehyde Introduction time in Minutes | Conversion g./h. | Molecular Weight calculated for— | Calculated | | | | Found | | | | Density, $D_4^{20}$ | Refractive Index, $n_D^{30}$ |
|---|---|---|---|---|---|---|---|---|---|---|---|---|---|---|---|---|---|
| | | | | | | | | C | H | O | Found | C | H | O | | |
| 1 | n-Propanol 420.6 | 210 | 40 | None | 90 | 140 | $C_4H_{10}O_2$ 90.12 | 53.31 | 11.19 | 35.51 | 93 | 52.90 | 11.09 | 35.80 | 0.9897 | 1.4032 |
| | | 210 | 40 | Triethylamine, 0.1 | 60 | 210 | $C_4H_{10}O_2$ 90.12 | 53.31 | 11.19 | 35.51 | 92 | 52.67 | 11.15 | 35.86 | | |
| 2 | Cyclohexanol 701.1 | 210 | 30 | None | 320 | 394 | $C_7H_{14}O_2$ 120.10 | 70.00 | 8.36 | 26.64 | 125 | 70.36 | 3.39 | 26.87 | | 1.4584 |
| | | 210 | 30 | Tri-n-butylamine, 0.05 | 50 | 252 | $C_7H_{14}O_2$ 120.10 | 70.00 | 8.36 | 26.64 | 125 | 70.24 | 3.29 | 26.91 | | |
| 3 | Laurylalcohol 872.7 | 60 | 30 | None | 65 | 56 | $C_{13}H_{28}O_2$ 216.35 | 72.16 | 13.05 | 14.79 | 224 | 72.30 | 13.09 | 14.52 | 0.8916 | 1.4411 |
| | | 60 | 30 | Tri-n-butylamine, 0.08 | 35 | 103 | $C_{13}H_{28}O_2$ 216.35 | 72.16 | 13.05 | 14.79 | 225 | 72.06 | 13.12 | 14.89 | | |
| 4 | sec. Butanol 444.7 | 180 | 40 | None | 80 | 135 | $C_5H_{12}O_2$ 104.15 | 57.66 | 11.61 | 30.73 | 106 | 57.45 | 11.63 | 30.87 | 0.9083 | 1.4075 |
| | | 180 | 40 | Borotrifluoride etherate, 0.01 | 55 | 197 | $C_5H_{12}O_2$ 104.15 | 57.66 | 11.61 | 30.73 | 108 | 57.72 | 11.75 | 30.92 | | |
| 5 | 2-ethylhexane-diol(1,3) 200.3 | 120 | 40 | None | 105 | 68.5 | $C_9H_{20}O_4$ 192.25 | 56.22 | 10.49 | 33.29 | 198 | 56.54 | 10.56 | 33.15 | | |
| | | 120 | 40 | Borotrifluoride etherate, 0.01 | 60 | 120 | $C_9H_{20}O_4$ 192.25 | 56.22 | 10.49 | 33.29 | 199 | 56.48 | 10.38 | 33.45 | | |
| 6 | Propylene-glycol-monoacrylate 696.7 | 180 | 15 | None | 105 | 103 | $C_7H_{12}O_4$ 160.17 | 52.49 | 7.55 | 39.96 | 164 | 52.86 | 7.48 | 39.74 | 1.1097 | |
| | | 180 | 15 | Tri-n-butylamine, 0.02 | 70 | 154 | $C_7H_{12}O_4$ 160.17 | 52.49 | 7.55 | 39.96 | 163 | 52.39 | 7.46 | 40.25 | | |
| 7 | Butanediol (1,4) 270.4 | 180 | 40 | None | 110 | 98 | $C_6H_{14}O_4$ 150.17 | 47.98 | 9.40 | 42.62 | 156 | 47.70 | 9.20 | 43.10 | 1.4451 | 1.4466 |
| | | 180 | 40 | Piperidine, 0.04 | 70 | 154 | $C_6H_{14}O_4$ 150.17 | 47.98 | 9.40 | 42.62 | 154 | 47.82 | 9.32 | 42.86 | | |

EXAMPLES 8 TO 10

In the same apparatus used in Examples 1 to 7, formaldehyde is reacted as indicated in Table II. Comparisons are again made of hemiformal production with and without catalysts. In the latter cases no reaction occurs at the low temperatures indicated. The formaldehyde which is conducted into the alcohol is not absorbed thereby but only bubbles through. The catalyzed reaction is quantitative and occurs with the liberation of much heat, which is conducted away.

TABLE II

| Ex. | Alcohol, parts by weight | Formaldehyde, parts by weight [a] | Reaction Temp., °C. | Catalyst, parts | Formaldehyde Introduction time in minutes | Conversion g./h. | Molecular Weight calculated for— | Calculated | | | | Found | | | | Density, $D_4^{20}$ | Refractive Index, $n_D^{20}$ |
|---|---|---|---|---|---|---|---|---|---|---|---|---|---|---|---|---|---|
| | | | | | | | | C | H | O | Calculated | Found | C | H | O | | |
| 8 | Glycerol ........ 644.6 | 210 | 35 | None | [b] 90 | | | | | | | | | | | | | |
| | | 210 | 35 | Tri-n-butylamine, 0.05 | 90 | 140 | $C_4H_{10}O_4$ | 39.34 | 8.25 | 52.41 | 122.12 | 130 | 39.23 | 8.32 | 52.68 | 1.2680 | 1.4671 |
| 9 | Cyclohexane-dimethanol (50% cis, 50% trans) ........ 288 | 120 | 50 | None | [b] 50 | | | | | | | | | | | | | |
| | | 120 | 50 | Tri-n-butylamine | 50 | 144 | $C_{10}H_{20}O_4$ | 58.80 | 9.87 | 31.33 | 204.26 | 212 | 58.60 | 9.96 | 31.67 | | 1.4755 |
| 10 | Glycerol ........ 184.2 | 180 | 40 | None | [b] 95 | | | | | | | | | | | | | |
| | | 180 | 40 | Triethylamine, 0.1 | 95 | 270 | $C_8H_{12}O_6$ | 39.56 | 7.75 | 52.70 | 182.17 | 190 | 39.86 | 7.81 | 52.94 | 1.2777 | 1.4609 |

[a] =Formaldehyde. [b] =No formaldehyde absorption. [c] = Glycerol-mono-hemiformal.

EXAMPLE 11

In the same apparatus used in Examples 1 to 7, 148.2 parts tert. butanol and 0.1 part $BF_3$-etherate are mixed and heated to 82° C. 60 parts formaldehyde are conducted into the mixture in the course of 35 minutes while the temperature is kept at 82° C. by intense cooling. There is produced butanol hemiformal as a clear, limpid liquid which, however, decomposes in 2 to 12 hours with the separation of paraformaldehyde.

EXAMPLE 12

In the same apparatus used in Examples 1 to 7, but provided with a reflux cooler, 330.3 parts resorcinol are dissolved in 1656 parts ether, 0.1 part triphenylphosphine is added, and at 20° C. 180 parts by weight of formaldehyde are conducted in during 95 minutes with vigorous stirring and intense cooling. The ether is distilled off under a water aspirator vacuum while the sump temperature is not allowed to rise above 20° C. 506 parts of a strongly viscous clear liquid are obtained which is shown by elementary analysis and infra-red spectroscopy to be resorcin-bis-hemiformal.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. In a method of making O-hemiacetals of formaldehyde comprising:
   (a) adding gaseous formaldehyde to:
   (b) a liquid comprising an organic compound containing at least one hydroxyl group, selected from the group consisting of alcohols and phenols; and
   (c) reacting (a) and (b) with vigorous and sufficient agitation to insure uniform distribution of said formaldehyde, the rate of adding said formaldehyde being sufficiently slow so that the concentration of free formaldehyde in the solution does not exceed 8%,
the improvement comprising conducting said reaction with cooling at a temperature between $-100°$ and 150° C. in the presence of a catalytic quantity of a catalyst selected from the group consisting of concentrated sulfuric acid, perchloric acid, hydrochloric acid, p-toluene-sulfonic acid, $BF_3$, $BF_3$-etherate, oxonium fluoborate, triethylamine, tri-n-butylamine, pyridine, piperidine, diethylamine, cyclohexylethylamine, butylamine, N-methyl-aniline, cyclohexylamine, isoamylamine, tri-n-octylamine, triphenylphosphine, tri-n-butylphosphine, tri-n-butyl-stibine, tri-n-butyl-arsine, tetramethyl ammonium bromide, and mixtures thereof.

2. The method of claim 1, wherein the catalyst is butylamine.

3. The method of claim 1, wherein the catalyst is tri-n-butylamine.

4. The method of claim 1, wherein the catalyst is borontrifluoride etherate.

5. The method of claim 1, wherein the catalyst is piperidine.

6. The method of claim 1, wherein the catalyst is triethylamine.

7. A method as defined by claim 1 wherein said catalyst is present in an amount of 0.0001% to 2% relative to the weight of said organic compound containing at least one hydroxyl group.

8. The method of claim 1 wherein the catalyst is triphenyl-phosphine.

9. A process as defined by claim 1 wherein said organic compound containing at least one hydroxyl group is selected from the group consisting of tertiary butanol, resorcinol, hydroquinone, pyrogallol and tertiary amyl alcohol.

10. The O-hemiacetal of cyclohexane-dimethanol and formaldehyde.

11. The di-O-hemiacetal of cyclohexane-dimethanol and formaldehyde.

References Cited

UNITED STATES PATENTS 2,333,927  11/1943  Harvey.

OTHER REFERENCES

Walker, Formaldehyde (1944) pp. 37–38.
Raff et al. Canadian Journal of Chemistry (1951) pp. 857–862.

BERNARD HELFIN, Primary Examiner

U.S. Cl. X.R.

260—2, 491, 578, 584, 602, 609, 613, 615, 999

UNITED STATES PATENT OFFICE
CERTIFICATE OF CORRECTION

Patent No. 3,519,691　　　　　　　　　Dated July 7, 1970

Inventor(s) HANS VON PORTATIUS

It is certified that error appears in the above-identified patent and that said Letters Patent are hereby corrected as shown below:

Column 4, Line 53, change "-$C_6H_3$-" to ---$C_6H_4$---

Column 4, Line 56, change "$CH_4$" to ---$CH_3$---

SIGNED AND
SEALED
OCT 27 1970

(SEAL)
Attest:

Edward M. Fletcher, Jr.
Attesting Officer

WILLIAM E. SCHUYLER, JR.
Commissioner of Patents